US008291411B2

(12) United States Patent
Beaty et al.

(10) Patent No.: US 8,291,411 B2
(45) Date of Patent: Oct. 16, 2012

(54) DYNAMIC PLACEMENT OF VIRTUAL MACHINES FOR MANAGING VIOLATIONS OF SERVICE LEVEL AGREEMENTS (SLAS)

(75) Inventors: Kirk A. Beaty, Goldens Bridge, NY (US); Norman Bobroff, Katonah, NY (US); Andrzej Kochut, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 12/043,260

(22) Filed: Mar. 6, 2008

(65) Prior Publication Data

US 2008/0295096 A1 Nov. 27, 2008

Related U.S. Application Data

(60) Provisional application No. 60/939,151, filed on May 21, 2007.

(51) Int. Cl.
 G06F 9/455 (2006.01)
 G06F 9/46 (2006.01)
(52) U.S. Cl. ............ 718/1; 718/100; 718/101; 718/102; 718/103; 718/104; 718/105; 718/106
(58) Field of Classification Search ........................ None
 See application file for complete search history.

(56) References Cited

U.S. PATENT DOCUMENTS

| 6,985,937 | B1 | 1/2006 | Keshav et al. |
| 2005/0108712 | A1 | 5/2005 | Goyal |
| 2005/0256759 | A1* | 11/2005 | Acharya et al. ................. 705/10 |
| 2006/0184937 | A1 | 8/2006 | Abels et al. |
| 2006/0230407 | A1 | 10/2006 | Rosu et al. |
| 2006/0242647 | A1 | 10/2006 | Kimbrel et al. |
| 2007/0043860 | A1* | 2/2007 | Pabari ........................... 709/224 |

OTHER PUBLICATIONS

Almeida et al. Resource Management in the Autonomic Service-Oriented Architecture. [online] (Jun. 16, 2006). IEEE, pp. 84-92. Retrieved From the Internet <http://ieeexplore.ieee.org/xpls/abs_all.jsp?arnumber=1662385>.*
Abdelzaher et al., Performance Guarantees for Web Server End-Systems: A Control-Theoretical Approach, in Proceedings of the IEEE Transactions on Parallel and Distributed Systems, 2002.
Alvarez et al., Minerva: An Automated Resource Provisioning Tool for Large-Scale Storage Systems, in Proc. of ACM Transactions on Computer Systems, 2001.
Banga et al., Resource Containers: A New Facility for Resource Management in Server Systems. in Proceedings of the Symposium on Operating Systems Design and Implementation, 1999.
Barham et al. Xen 2002. Technical Report UCAM-CL-TR-553, University of Cambridge, Computer Laboratory, 2003.
Chandra et al., Dynamic Resource Allocation for Shared Data Centers using Online Measurements. in Proceedings of the IEEE International Workshop on Quality of Service, 2003.

(Continued)

*Primary Examiner* — Emerson Puente
*Assistant Examiner* — Jonathan R Labud
(74) *Attorney, Agent, or Firm* — Ryan, Mason & Lewis, LLP

(57) ABSTRACT

Historical data is measured for a computer server system. Future demand for service in the computer server system is forecast based on the historical data, and the mapping of virtual machines to physical machines is updated based on the forecast of the future demand. Measurement, forecasting, and placement modules can be employed.

18 Claims, 16 Drawing Sheets

OTHER PUBLICATIONS

Chase et al., Managing Energy and Server Resources in Hosting Centres. in Proceedings of the ACM Symposium on Operating Systems Principles, pp. 103-116, 2001.
Clark et al., Live Migration of Virtual Machines, in Proceedings of the Symposium on Networked Systems Design and Implementation, 2005.
IBM Corporation. Advance POWER Virtualization on IBM System p5. http://www.redbooks.ibm.com/abstracts/sg247940.html, May 2008.
IBM Corporation. SAN vol. Controller. http://www.ibm.com/servers/storage/software/virtualization/svc, 2009.
Creasy et al., The Origin of the VM/370 Time-Sharing System. IBM Journal of Research and Development, 1981.
Dragovic et al., Xen and the Art of Visualization. In Proceedings of the ACM Symposium on Operating Systems Principles, 2003.
VMWare EMC. http://www.vmware.com, 2008.
Goel et al., Stochastic Load Balancing and Related Problems. in Proceedings of Annual Symposium on Foundations of Computer Science, 1999.
Gum, System/370 Extendable Architecture: Facilities for Virtual Machines. IBM Journal of Research and Development, 1983.
Huang, Stonehenge: A High Performance Virtualized Storage Cluster with QoS Guarantee. Technical Report TR-138, ECSL, Computer Science Department, Suny Stony Brook, 2003.
Kimbrel et al., Dynamic Application Placement under Service and Memory Constraints. in Proceedings of International Workshop on Efficient and Experimental Algorithms, 2005.
Pacifici et al., Performance Management for Cluster Based Web Services. in Proceedings of the IEEE/IFIP Symposium on Integrated Management, 2003.
Rolia et al., Statistical Service Assurances for Applications in Utility Grid Environments. Performance Evaluation Journal, 58(2+3):319-339, 2004.
Sapuntzakis et al., Optimizing the Migration of Virtual Computers. in Proceedings of the Symposium on Operating Systems Design and Implementation, 2002.
Shen et al., Integrated Resource Management for Cluster-based Internet Services. in Proceedings of the USENIX Symposium on Operating Systems Design and Implementation, 2002.
Sugerman et al., Virtualizing I/O Devices on VMware Workstation's Hosted Virtual Machine Monitor. in Proceedings of USENIX, 2001.
Urgaonkar et al., Resource Overbooking and Application Profiling in Shared Hosting Platforms. in Proceedings of the Symposium on Operating Systems Design and Implementation, 2002.
Waldspurger et al., Memory Resource Management in VMware ESX Server. in Proceedings of the Symposium on Operating Systems Design and Implementation, 2002.
Huang et al., Multi-Dimensional Storage Virtualization. in Proceedings of Sigmetrics Performance Evaluation Review, 2004.
Kimbrel et al., Minimizing Migration in Fair Multiprocessor Scheduling of Persistent Tasks. in Proceedings of Annual ACM-SIAM Symposium on Discrete Algorithms, 2004.
Shen et al., Predictive Models for Proactive Network Management: Application to a Production Web Server. in Proceedings of the IEEE/IFIP Network Operations and Management Symposium, 2000.
Govil et al., Cellular Disco: Resource Management using Virtual Management using Virtual Machines on Shared Memory Multiprocessors. in Proceedings of Symposium on Operating Systems Principles, 1999.
Goldberg, Survey of Virtual Machine Research. in IEEE Computer Magazine, 1974.
Xen. http://www.xensource.com, 2008.
Meiosys. http://www.meiosys.com, 2005.
Time Series—Wikipedia, http://en.wikipedia.org/wiki/Time_series_analysis, pp. 1-5, Dec. 16, 2009
Bin packing problem—Wikipedia, http://en.wikipedia.org/wiki/Bin_packing, pp. 1-3. Dec. 18, 2009.
Khanna et al., Dynamic Application Management to Address SLAs in a Virtualized Server Environment, in Proceedings of IEEE/IFIP Network Operations and Management Symposium, 2006.
Shahabuddin et al., Stream-Packing: Resource Allocation in Web Server Farms with a QoS Guarantee. Lecture Notes in Computer Science, 2001.
Jeffrey S Chase, Darrell C Anderson, Prachi N Thakar, Amin Vandat, and Ronald P Doyle Managing Energy and Server Resources in Hosting Centres in Proceedings of the ACM Symposium on Operating Systems Principles, pp. 103ñ116, 2001.
Faerman, M, et al "Adaptive Performance Prediction for Distributed Data Intensive Applications" Jan. 1999, Proceedings of the 1999 ACM/IEEE Conference on Supercomputing (COROM).

* cited by examiner

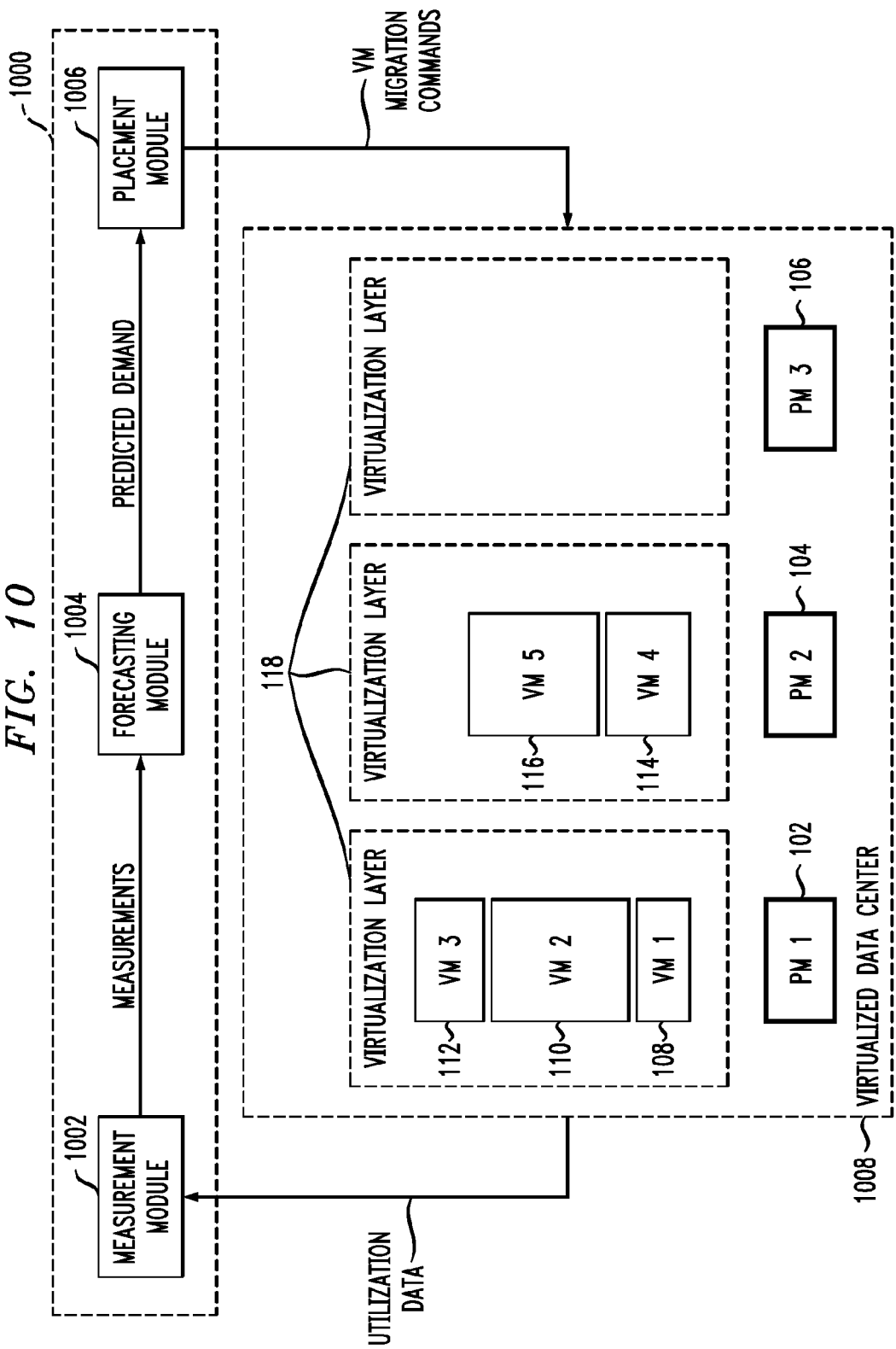

FIG. 11

| | |
|---|---|
| $M$ | NUMBER OF PMs |
| $N$ | NUMBER OF VMs |
| $R$ | MIGRATION INTERVAL |
| $p$ | DESIRED PERCENTILE OF OVERLOADS, i.e., PERCENTAGE OF INTERVALS IN WHICH A PM IS OVERLOADED |
| $X$ | MATRIX (WITH DIMENSIONS NxM) DENOTING THE MAPPING OF VMs TO PMs. $x_{n,m}$ EQUALS 1 IF VM $n$ IS ASSIGNED TO PM $m$ AND 0 OTHERWISE |
| $U_i^n$ | RESOURCE DEMAND OF VM $n$ AT TIME $i$ |
| $u^n(x)$ | PROBABILITY DENSITY OF RESOURCE DEMAND OF VIRTUAL MACHINE $n$ |
| $c^m$ | CAPACITY OF PM $m$ |
| $f_{i,k}^n$ | FORECAST VALUE OF RESOURCE DEMAND OF VM $n$ AT TIME $i + k$ MADE AT TIME $i$ |
| $\sigma_n^2$ | VARIANCE OF PREDICTION ERROR FOR VM $n$ |
| $c_p(\mu, \sigma^2)$ | $(1-p)$-PRECENTILE OF GAUSSIAN DISTRIBUTION WITH MEAN $\mu$ AND VARIANCE $\sigma^2$ |

FIG. 12

```
% iterate over VMs and compute forecasted
% demand for next R steps
for n = 1, 2,..., N do
```
$$f_n = \max_{k=1}^{k=R} \{f_{t,k}^n\};$$
```
end for;

% Init alloc VMs to PMs
X=0;
% sort VMs in descending order
```
$S = \text{sort\_descending}(f_n : n = 1, 2,..., N);$ for VM $n$ in $S$ do

$allocated = false;$
  $best\_machine = 1;$
  $least\_over\ flow = MAX;$ for $m = 1, 2,..., M$ do
    % compute capacity to achieve p-percentile bound
$$demand = c_p \left( \sum_{i=1}^{i=N} f_i * x_{i,m} + f_n, \sum_{i=1}^{i=N} \sigma_i^2 * x_{i,m} + \sigma_n^2 \right);$$

if $demand \leq C^m$ then
      $x_{n,m} = 1;$
      $allocated = true;$
      $break;$
    else if $demand - C^m < least\_over\ flow$ then
      $best\_machine = m;$
      $least\_over\ flow = demand - C^m;$
    end if;
  end for;

% if machine could not be placed without overloading
  % place on the least overloaded one
  if $allocated == false$ then
    $x_{n,best\_machine} = 1;$ end if;

end for;

$power\_down\_unused\_machines;$

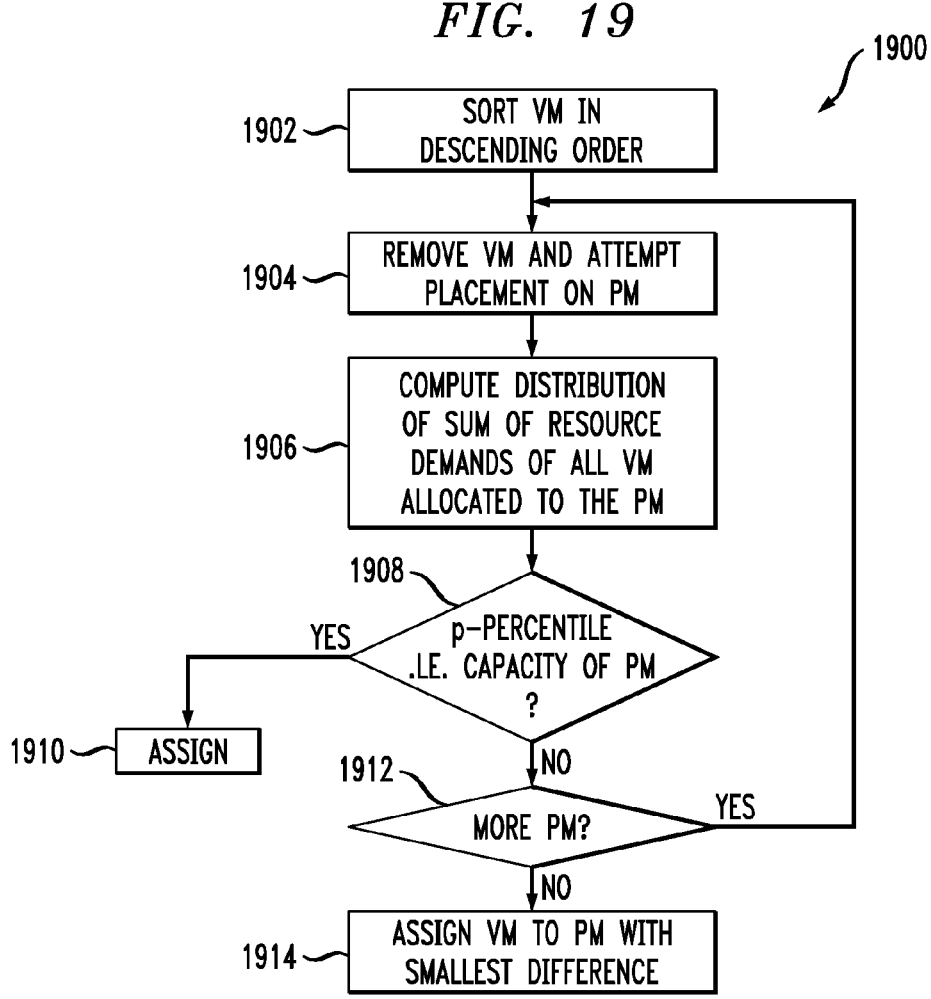
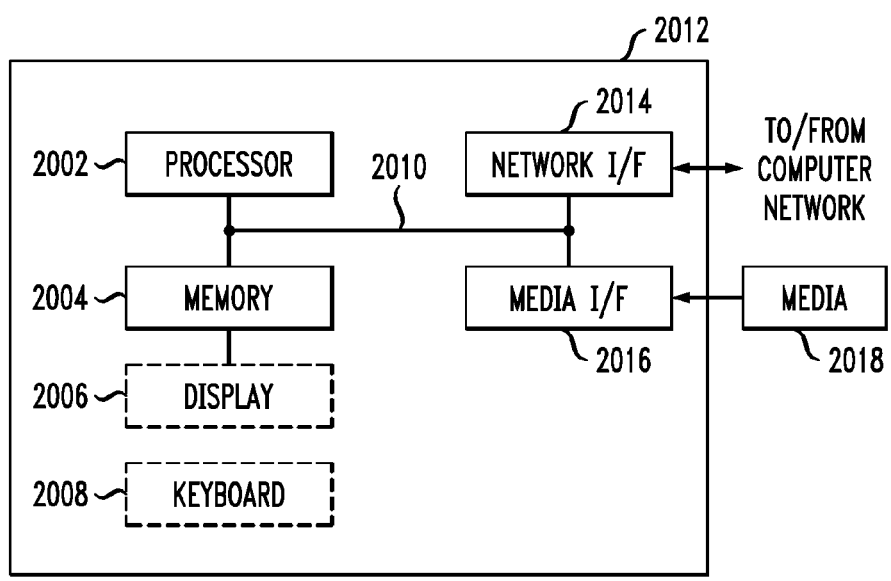

DYNAMIC PLACEMENT OF VIRTUAL MACHINES FOR MANAGING VIOLATIONS OF SERVICE LEVEL AGREEMENTS (SLAS)

CROSS-REFERENCE TO RELATED APPLICATIONS

This patent application claims the benefit of U.S. Provisional Patent Application Ser. No. 60/939,151 filed on May 21, 2007, and entitled "Dynamic Placement of Virtual Machines for Managing SLA Violations." The disclosure of the aforementioned Provisional Patent Application Ser. No. 60/939,151 is expressly incorporated herein by reference in its entirety for all purposes.

FIELD OF THE INVENTION

The present invention relates to the electrical, electronic and computer arts, and, more particularly, to efficient utilization of servers and the like.

BACKGROUND OF THE INVENTION

The low average utilization of servers is a well known cost concern in data center management. Energy costs are rising, and low utilization translates into more physical machines, increasing expenditures for machine power and capital, as well as operational costs for cooling systems. Furthermore, excess machines require more floor space and added labor costs.

Low utilization has several causes. To guarantee good performance at periods of peak demand, processing capacity is over-provisioned for many enterprise applications. However, processor demand typically exhibits strong daily variability, leading to low average utilization. Another source of low utilization is the traditional deployment pattern of one application per operating system (OS) image and one OS image per unit of physical hardware. This paradigm is typically a consequence of ad-hoc deployment of new applications, as it guarantees application isolation and is very easy to implement.

Consolidation at the application and OS levels can mitigate inefficiencies in using physical resources. Application consolidation requires considerable skill to ensure isolation between co-hosted applications within an OS image. There are multiple aspects of isolation, such as security, resource contention, and co-sensitivity to patches and versions. An example of the latter is the case when updating one application may require an OS patch which is incompatible with a co-hosted application. Consolidation at the OS level avoids these compatibility issues and is generally the preferred approach for consolidating heterogeneous applications. Here, multiple OS images execute concurrently on a single physical platform, leveraging virtualization of the underlying hardware. Originally developed in the 1960's, as known from R. Creasy, The Origin of the VM/370 Time-Sharing System, *IBM Journal of Research and Development*, 1981; P. Gum. System/370 Extended Architecture: Facilities for Virtual Machines, *IBM Journal of Research and Development*, 1983; and R. Goldberg, Survey of Virtual Machine Research, in *IEEE Computer Magazine*, 1974, hardware and software virtualization support for commercial operating systems continues to mature on both x86 and RISC processing platforms, as set forth in IBM Corporation, Advanced POWER Virtualization on IBM System p5, http://www.redbooks.ibm.com/abstracts/sg247940.html, and evidenced by technologies such as VMware EMC, http://www.vmware.com, and Xen, now available from Citrix Systems, Inc., http://www.citrixxenserver.com/Pages/default.aspx. In a typical environment, a so-called "hypervisor" executes on a physical machine (PM) and presents an abstraction of the underlying hardware to multiple virtual machines (VMs). The hypervisors support lifecycle management functions for the hosted VM images, and increasingly facilitate both offline and live migration of the execution environment for the VM, as known from the aforementioned VMware and Xen technologies.

Server consolidation can be static or dynamic. In static consolidation, historical average resource utilizations are typically used as input to an algorithm that maps VMs to PMs. After initial static consolidation, the mapping may not be recomputed for long periods of time, such as several months, and is done off-line. In contrast, dynamic allocation is implemented on shorter timescales, preferably shorter than periods of significant variability of the resource demand. Dynamic allocation leverages the ability to conduct live migration of VMs. This concept is illustrated in FIG. 1. Three physical machines 102, 104, 106 with a virtualization layer 118 are used to execute five virtual machines 108, 110, 112, 114, and 116. In the initial configuration, PM 3, numbered 106, can be in a low power state or powered down, because it is not hosting any VMs. In response to a demand change PM 3 is activated and VM 5, numbered 116, is migrated from PM 2, numbered 104, to PM 3. The initial position is denoted by solid lines while the position after migration is denoted with dotted lines. The migration occurs without service interruption.

SUMMARY OF THE INVENTION

Principles of the present invention provide techniques for dynamic placement of virtual machines for managing violations of service level agreements (SLAs). In one aspect, an exemplary method (which can be computer implemented) is provided for managing service capacity in a computer server system having a plurality of physical machines and a plurality of virtual machines mapped to the plurality of physical machines according to an initial mapping. The method includes the steps of measuring historical data for the computer server system, forecasting future demand for service in the computer server system based on the historical data, and updating the mapping of the virtual machines to the physical machines based on the forecasting of the future demand.

In another aspect, an exemplary apparatus is provided for managing service capacity in a computer server system having a plurality of physical machines and a plurality of virtual machines mapped to the plurality of physical machines according to an initial mapping. The apparatus includes a measurement module configured to measure historical data for the computer server system, a forecasting module configured to forecast future demand for service in the computer server system based on the historical data, and a placement module configured to update the mapping of the virtual machines to the physical machines based on the forecast of the future demand.

One or more embodiments of the invention or elements thereof can be implemented in the form of a computer program product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention may offer one or more technical benefits; for example, providing substantial improvement over static server consolidation in reducing the amount of required capacity and the rate of service level agreement violations. In one or more embodiments, benefits accrue for workloads that are variable and can be forecast over intervals shorter than the time scale of demand variability. Further, in one or more instances of the invention, the amount of physical capacity required to support a specified rate of SLA violations for a given workload may be reduced significantly (for example, by as much as 50%) as compared to a static consolidation approach. Yet further, in one or more embodiments, the rate of SLA violations at fixed capacity may be reduced significantly as well, for example, by up to 20%. The benefits of one or more embodiments of the invention may be realized in connection with a variety of operating systems, applications, and industries.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 10 is an exemplary embodiment of an apparatus, according to an aspect of the invention, interacting with a data center to be managed;

FIG. 11 shows notation used herein;

FIG. 12 shows exemplary pseudo-code for implementing aspects of the invention;

FIGS. 18 and 19 are flow charts showing certain possible details of the method of FIG. 17; and FIG. 20 depicts a computer system that may be useful in implementing one or more aspects and/or elements of the present invention.

DETAILED DESCRIPTION OF PREFERRED EMBODIMENTS

One or more embodiments of the invention leverage consolidation based on server virtualization and image migration to address issues of low utilization of physical resources, and provide techniques for dynamic resource allocation in virtualized server environments, which, in one or more embodiments, reduce and even minimize the cost of running the data center. The cost has competing terms that penalize both (i) overcapacity (low utilization) and (ii) overloading, which causes poor application performance and violates contractual Service Level Agreements (SLAs). SLAs are typically expressed as CPU or response time guarantees. An SLA expressed as a response time for an enterprise process spanning multiple machines is translated into a CPU guarantee at each VM. An exemplary inventive method is based on measuring historical data, forecasting the future demand, and remapping VMs to PMs, and is subsequently referred to as Measure-Forecast-Remap (MFR). This sequence of steps is iterated at regular successive intervals denoted by $\tau$. At each placement step, the minimum number of hosts required to support the VMs is computed, subject to a constraint on the probability of overloading the servers during the interval $\tau$. One or more inventive techniques exploit periodic variability of the demand to achieve reduction in resource consumption.

Figure 2:
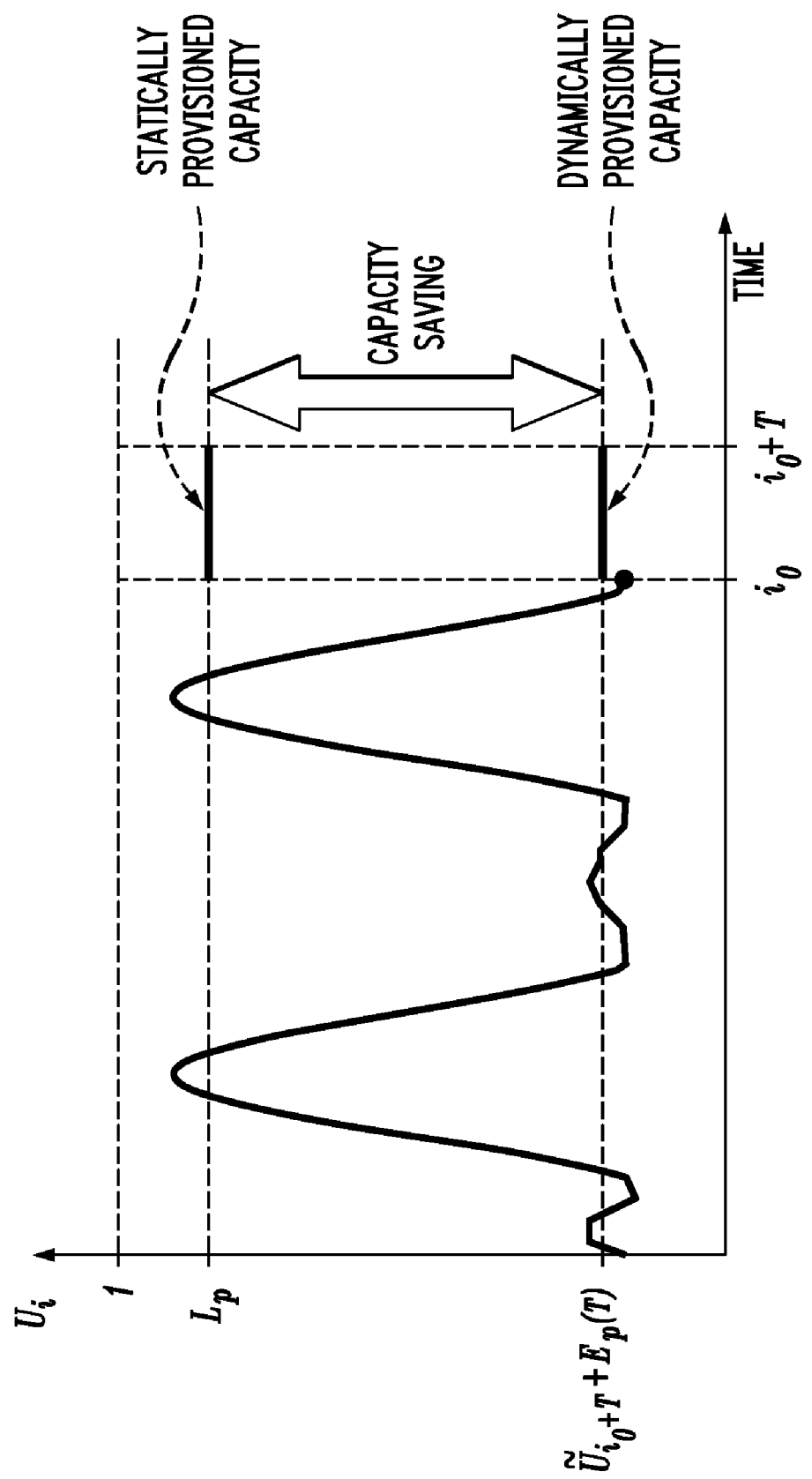
FIG. 2 depicts capacity savings available according to one non-limiting exemplary embodiment of the invention.
Figure 3:
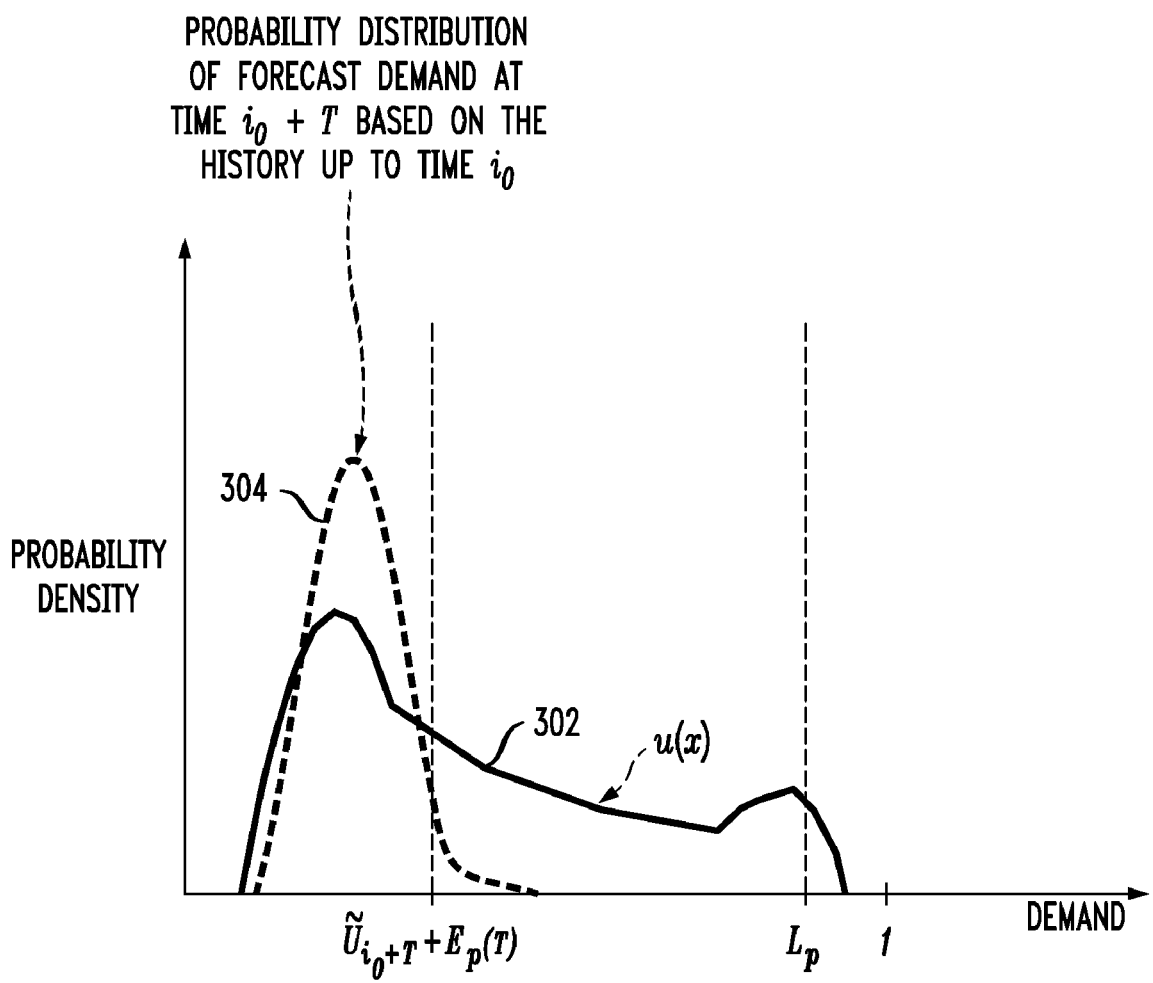
FIG. 3 depicts a probability distribution of forecast demand at a certain time, based on historical data, according to an aspect of the invention.

For illustrative purposes, consider an example of a single PM for which the CPU capacity can be dynamically adjusted at time intervals of length $\tau$. A single VM is placed on this PM. The goal is to dynamically adjust resource capacity of the PM to ensure that the probability of the VM demand exceeding capacity of the PM is no greater than p. The time series of the VM's CPU demand ($U_i$) up to time $i_0$ is shown in FIG. 2, while the solid line 302 of FIG. 3 is the probability distribution of $U_i$ over this interval. In static allocation, the rate of CPU threshold violations is guaranteed to be less than 1−p by setting the capacity to $L_p$. In dynamic allocation, the capacity to be allocated for the next interval of length $\tau$ is predicted at time $i_0$ based on a window of the historical demand prior to time $i_0$. The forecast average demand in the next interval is denoted by $\overline{U}_{i_0+\tau}$. The distribution of error in the forecast, $E(\tau)$, depends on the length of prediction interval $\tau$, and is shown in the dashed curve 304 of FIG. 3. The p-percentile of the distribution of the forecast error is $E_p(\tau)$. In such case, allocate $\overline{U}_{i_0+\tau}+E_p(\tau)$ of capacity for the interval of interest. This provides a probabilistic guarantee of satisfying the actual demand with probability 1−p. It can be seen in FIG. 2 that the net capacity savings in this interval due to dynamic allocation is equal to $L_p-\overline{U}_{i_0+\tau}-E_p(\tau)$. As set forth below, this idea can be extended to multiple VMs and PMs.

Aspects of the invention include:
a method for classification of workload signatures to identify those servers which benefit most from dynamic migration—an analytical formula disclosed herein can be used to classify virtual machines based on readily obtainable metrics.

forecasting technique suited for handling time series of resource demands in a typical data center and capable of automatic adaptation to various dominating periodic patterns.

management techniques, referred to as MFR, that dynamically remap VMs to PMs, reducing or minimizing the number of PMs required to support a workload at a specified rate of SLA violations, and that reduce the rate of SLA violations for a fixed capacity as compared with a static approach.

Server Workload Signatures that Benefit from Dynamic Placement

Aspects of the invention advantageously leverage the patterns of resource demand to provide statistical guarantees of service quality while reducing or minimizing the amount of consumed resources. There are several properties that make a workload suitable for dynamic management. Unless the workload exhibits significant variability there is typically no benefit in dynamic management. Furthermore, the timescale over which the resource demand varies should exceed the rebalancing interval τ so that remapping of VMs to PMs keeps pace with the demand changes. It is useful to state this condition in terms of the frequency or power spectrum representation of the demand. Thus, the frequency content of dynamically managed resource demand should be dominated by components at frequencies smaller than 1/τ. Finally, resource demand needs to be predictable on timescales of the rebalance period τ. That is, the error distribution of the predictor should be significantly "narrower" than the distribution of the demand (refer to the discussion of FIG. 3). A time series is predictable if, for example, it has a deterministic periodic component or it has a strong autocorrelation.

Figure 4:
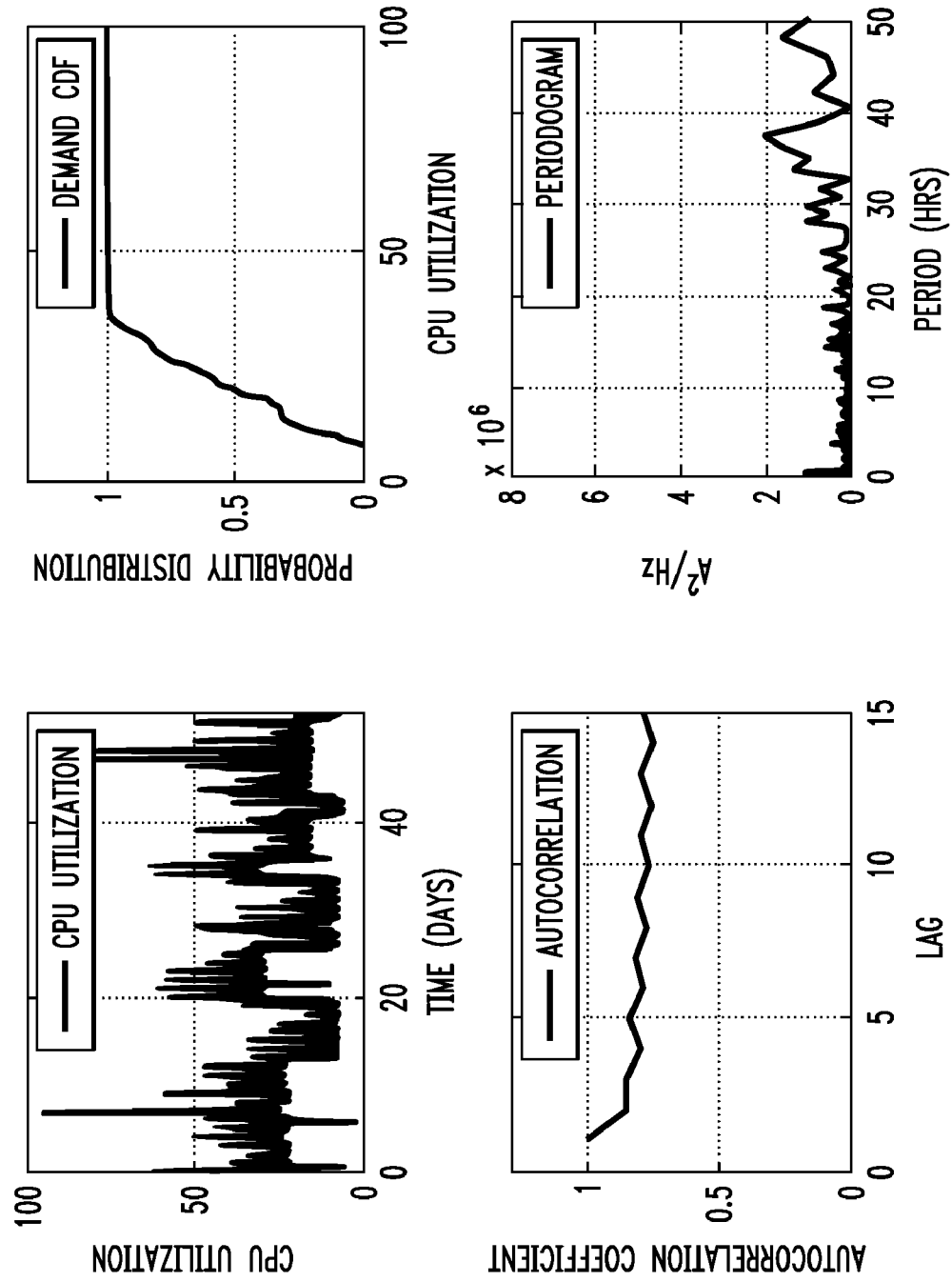
FIG. 4 depicts exemplary demand with high variability, strong autocorrelation, and no periodic component.
Figure 5:
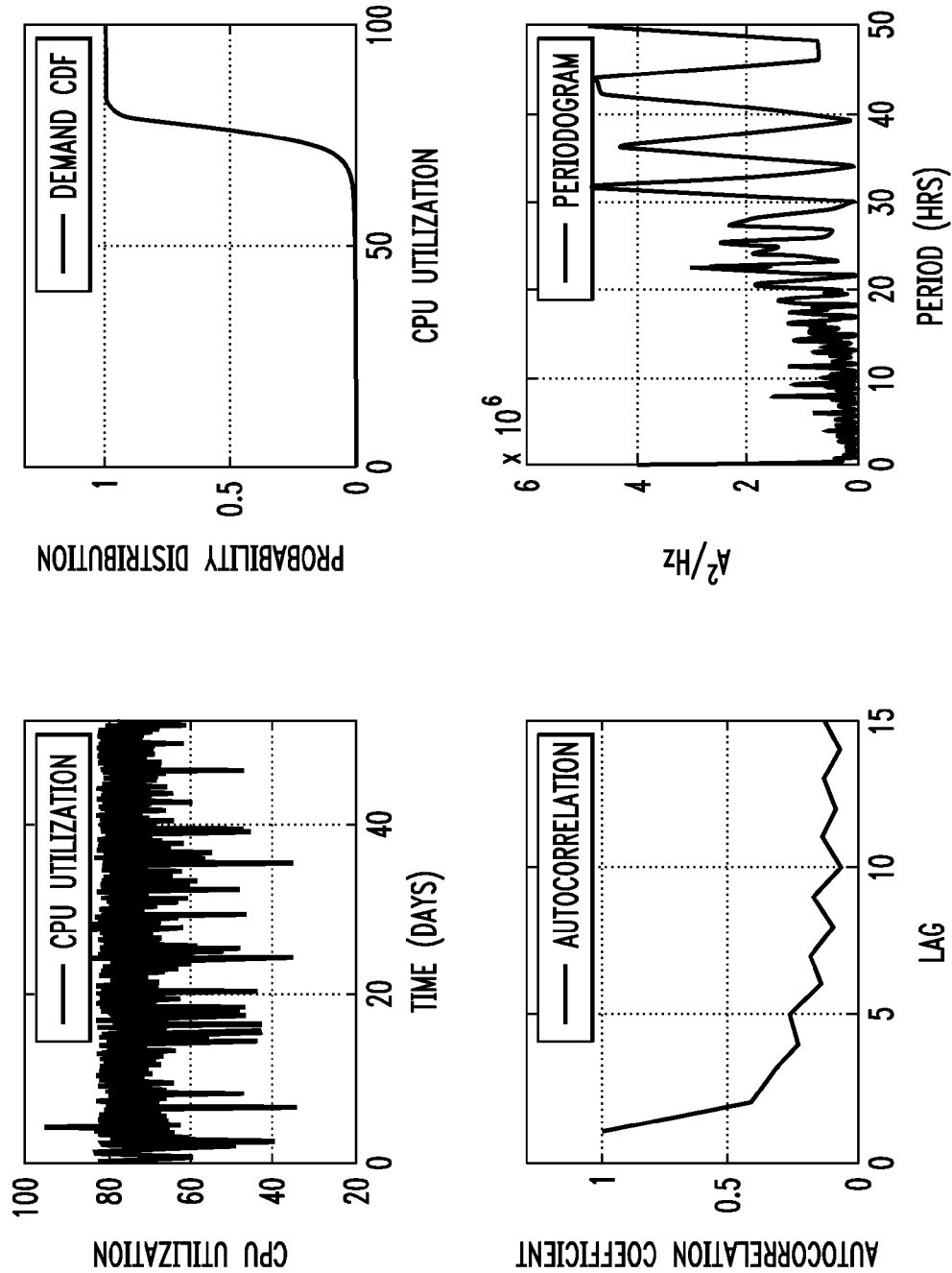
FIG. 5 depicts exemplary demand with low variability, weak autocorrelation, and no periodic component.
Figure 6:
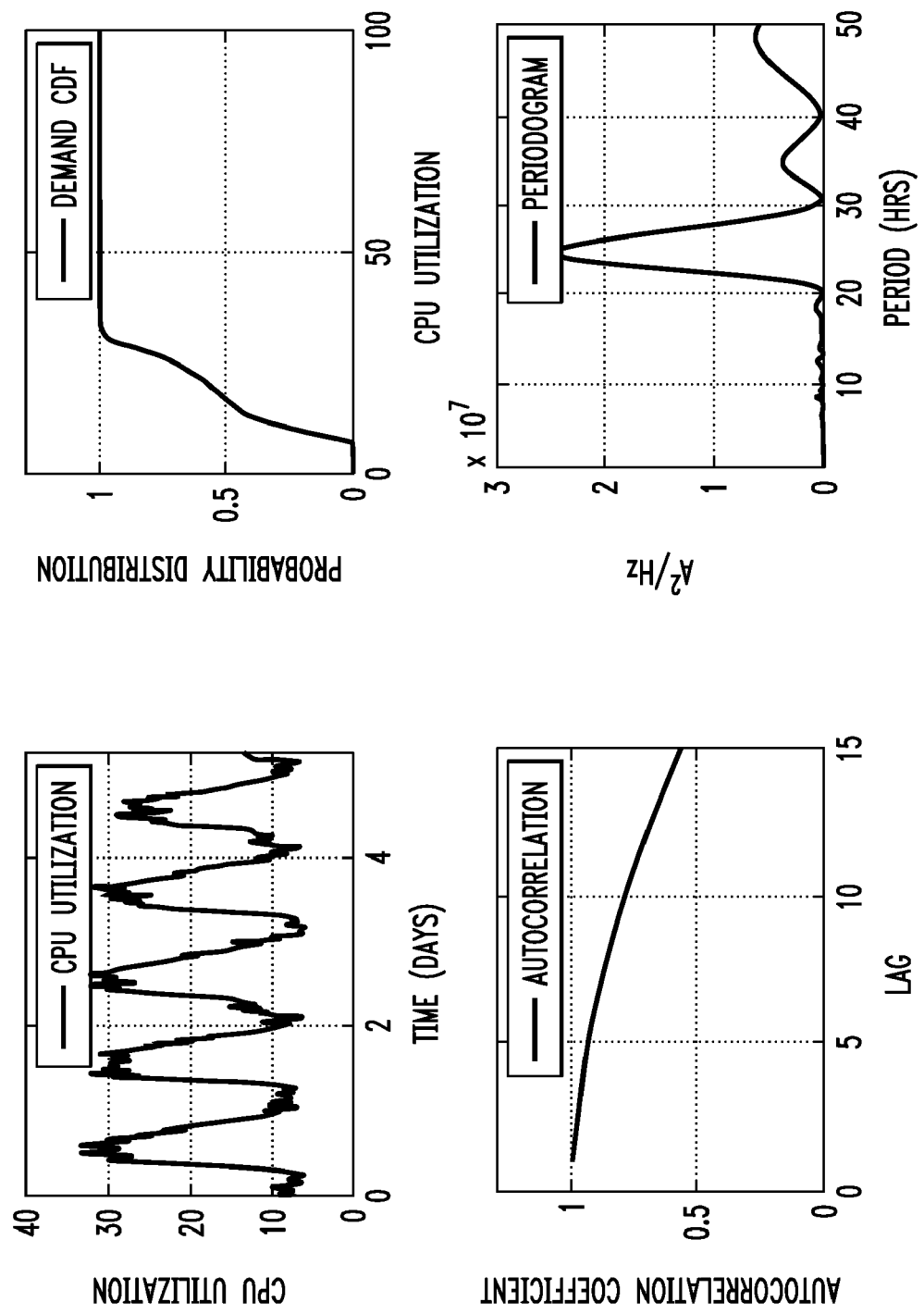
FIG. 6 depicts exemplary demand with strong variability, strong autocorrelation, and strong periodic component.

By studying a large number of traces from production servers, three main categories of behavior emerge, as illustrated in FIGS. 4-6. Each figure contains four perspectives on the data; raw CPU demand time series, cumulative distribution of demand, autocorrelation function, and periodogram.

The data in FIG. 4 is strongly variable and has an autocorrelation of about 0.8 over a long range. However, the periodogram shows an absence of strong periodic behavior. This workload is an example of a good candidate for dynamic management. Large variability offers significant potential for optimization, while strong autocorrelation makes it possible to obtain a low-error predictor. FIG. 5 typifies the category of weak variability as evidenced by the rapid increase of the CDF. It also has a quickly decaying, autocorrelation function and no distinct periodic component. This workload is not likely to benefit from dynamic management. It exhibits low variability that makes it difficult to realize any gain. A quickly decaying autocorrelation function and lack of periodicity make it difficult to forecast demand. On the contrary, FIG. 6 shows the type of signal that benefits most from dynamic migration. It is characterized by strong variability and autocorrelation combined with periodic behavior.

The examples presented above provide insight to how the classification of VMs should be done. However, it is advantageous to provide a way of quickly deciding whether a given VM is a good candidate for dynamic management. The following passages present an approximate gain formula that quantifies a relative gain from using dynamic management, assuming that capacity may be adjusted in a fine-grained fashion based on the requirements, e.g., such as increasing the fraction of a physical CPU assigned to a given logical partition on a machine such as an "IBM pSeries" machine available form International Business Machines Corporation of Armonk, N.Y.

As above, the reallocation interval is τ, the demand probability density is u(x), p-percentile of distribution u is $L_p$, distribution of predicted time series (with prediction horizon of τ) is $\bar{u}_\tau(x)$, and p-percentile of distribution of predictor error is $E_p(\tau)$. The gain $G(\tau)$ is the ratio of the time-averaged dynamically adjusted capacity to the statically allocated capacity with the same target overflow percentile p.

$$G(\tau) = \frac{\int_0^\infty [L_p - (x + E_p(\tau))] * \bar{u}_\tau(x) dx}{L_p} \quad (1)$$

The expression $L_p - (x + E_p(\tau))$ represents the capacity saving for a given capacity allocation x. The capacity saving is weighted with, $\bar{u}_\tau(x)$, the probability of being at this particular capacity level. Equation (1) simplifies to:

$$G(\tau) = 1 - \frac{\int_0^\infty x * \bar{u}_\tau(x) dx + E_p(\tau)}{L_p} \quad (2)$$

A closed form expression for $G(\tau)$ in terms of known quantities can be obtained from the following approximation:

$$\int_0^\infty x * \bar{u}_\tau(x) dx \approx \int_0^\infty x * u(x) dx = E[U] \quad (3)$$

In other words, the mean of the predictor is the same as the mean of the underlying distribution because the predictor is unbiased, i.e., the distribution of prediction error has a mean of zero. Note, that Equation (3) is exact when the time series is generated by a linear filter applied to a white noise process (the skilled artisan will be familiar with background information in G. Jenkins, G. Reinsel, and G. Box, *Time Series Analysis: Forecasting and Control*, Prentice Hall, 1994 ("Jenkins")).

This leads to the approximation formula:

$$G(\tau) \approx 1 - \frac{E[U] + E_p(\tau)}{L_p} \quad (4)$$

The inputs required to evaluate Formula (4) are readily available. The mean and p-percentile of the demand distributions are computed empirically from the demand history, while the error distribution is provided by the forecasting techniques (described in a greater detail below). Result (4) is used to decide how much a given virtual machine can gain from dynamic management. In particular, VMs can be categorized as predictable or unpredictable based on the value of Formula (4). Note that by multiplying Formula (4) by $L_p$ the absolute value of the gain from dynamic management is obtained.

Forecasting

An accurate forecast methodology that estimates the resource demand based on the observed history is advantageous in efficiently executing the trade-off between optimal resource usage and the penalties associated with SLA violations in a dynamic system, such as a data center. For each resource of interest (such as CPU or memory) the historical usage data is analyzed and a predictor is built that forecasts the probability distribution of demand in a future observation interval. The predictor can be used to forecast values for multiple intervals ahead. However, of course, the quality of prediction usually decreases with longer prediction horizons.

Known forecasting techniques from Jenkins can be adapted for application with embodiments of the invention, given the teachings herein. Any particular application, however, is influenced by the type of data encountered. The properties of the traces used here are shown in FIGS. 4-6 and explained above.

The periodograms of FIGS. 4-6 show that the CPU demand contains one or more periodic components (such as 24-hour in FIG. 6). In one or more embodiments of the invention, the demand time series $U_i$ is decomposed into a sum of periodic components $D^j$ such that $D_{i+n*p_j}{}^j = D_i{}^j$ where n is an integer and $p_j$ is a period. Specifically, $$U_i = \sum_{j=1}^{j=P} D_i^j + r_i \text{ for } i = 0, 1, \ldots \quad (5)$$

where $r_i$ is the residual component of the demand. The skilled artisan will be familiar with decomposing time series into periodic components and residuals in connection with the request arrival rate of a web server, as done by D. Shen and J. Hellerstein, Predictive Models for Proactive Network Management: Application to a Production Web Server, in *Proceedings of the IEEE/IFIP Network Operations and Management Symposium,* 2000 ("Shen and Hellerstein"). Shen and Hellerstein's work assumes daily and weekly variations, while in one or more embodiments of the invention, offline analysis of the periodogram is used to identify the key components, inasmuch as in one or more scenarios suitable for applications of inventive techniques, periodic intervals other than daily or weekly have been observed, for example FIG. 4 shows a period of 36 hours. By way of further explanation, one or more embodiments of the invention employ an approach to forecasting differs from Shen and Hellerstein's in the way the periodic components are treated. Since in one or more instances of the invention, the period of the signal is not known a priori, therefore the periodogram is used to determine the most significant periods and then they are sequentially decoupled them the time series. In Shen and Hellerstein, one dominating frequency is assumed.

In order to remove periodic components, according to an aspect of the invention, first smooth the time series using a low-pass filter (i.e., a filter with a time constant longer than the period of interest). The smoothed time series is then subdivided into contiguous intervals of length $p_j$ over a learning history. The intervals are averaged together to form $D_i{}^j$. The residuals are then found by subtracting the $D_i{}^j$ from the $U_i$ according to Equation (5).

Now that the periodic components are decoupled from the data, the residuals $r_i$ are modeled using a class of autoregressive (AR) processes. The skilled artisan will be familiar with such processes per se, for example, from Jenkins, and, given the teachings herein, can adapt them for use with embodiment(s) of the invention. In particular, some instances of the invention use AR(2), which assumes two autoregressive components. It has been demonstrated in the literature that lag 2 is sufficient in most of the cases.

In one or more embodiments, the model is the following:

$$r_i = \alpha_1 r_{i-1} + \alpha_2 r_{i-2} + \epsilon_i \quad (6)$$

for i=0, 1, . . .

where $\epsilon_i$ are the error terms. This model contains two parameters ($\alpha_1, \alpha_2$) that are estimated from the data. One non-limiting example of an appropriate technique to carry this out is given by Jenkins. The parameters $\alpha_1$ and $\alpha_2$ are preferably chosen to minimize mean squared error between the forecast $r_i$ and the observed time series data. In practice, a 'learning' period of the time series can be used to initially compute $\alpha$.

A prediction error can be tracked, and when it increases, the parameters $D_i{}^j$'s and $\alpha$s can be recomputed, thus adapting to long term changes in demand patterns. In some instances, the estimated model can be used to make predictions of future demand in a standard fashion. Given the teachings herein, the skilled artisan, familiar with Jenkins, can adapt the techniques of Jenkins to make such predictions. Prediction error can be computed empirically and represented using a Gaussian variable having mean $\mu$ and variance $\sigma^2$. The joint distribution in prediction error arising from multiple VMs placed together on each PM can be computed assuming statistical independence, inasmuch as the periodic behavior, which is responsible for most of the correlation, has been removed from the time series. The resulting distribution of prediction error can be used in exemplary management techniques of the invention, discussed below, to bound the probability of overload.

Figure 7:
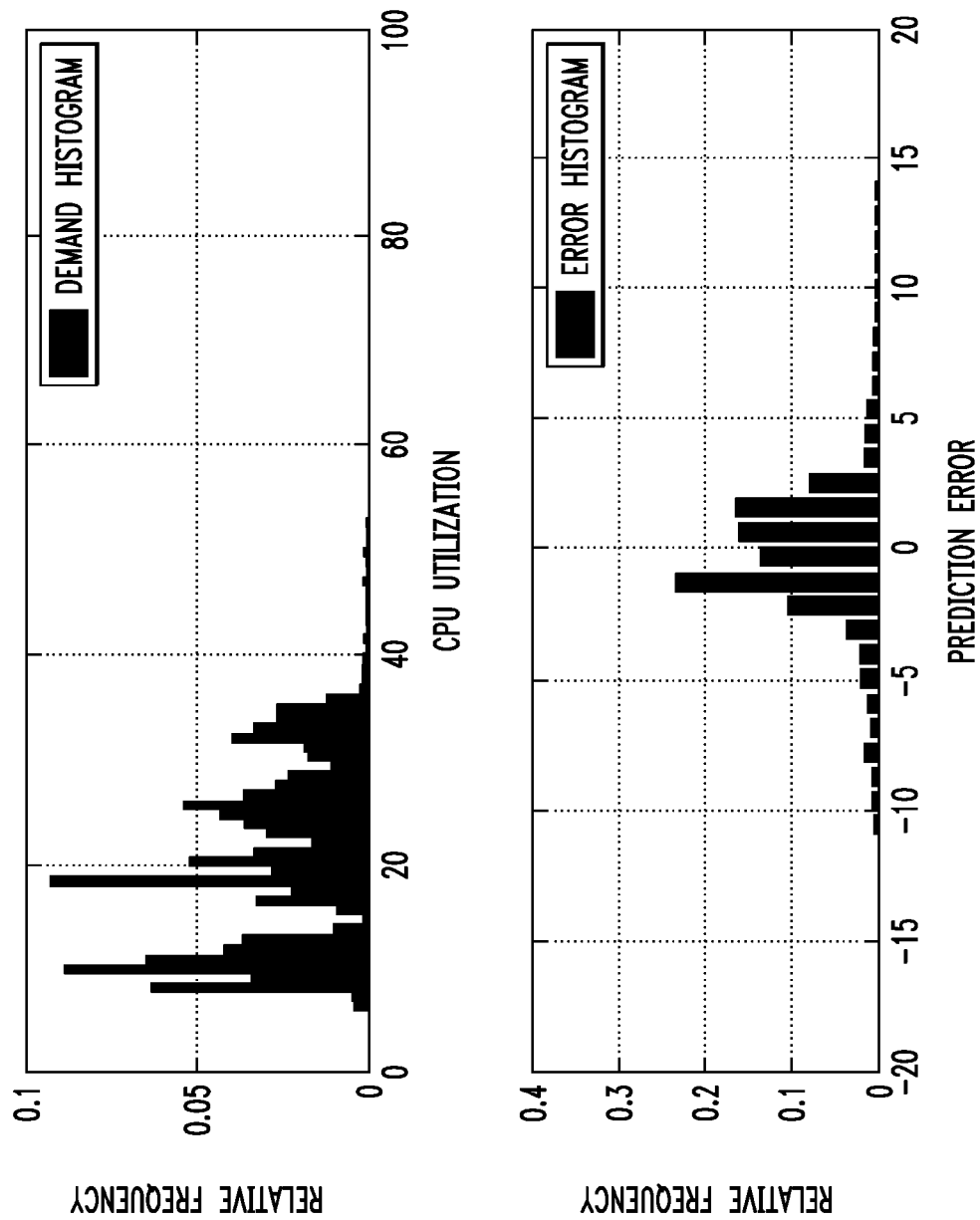
FIGS. 7-9 present three exemplary applications of exemplary predictive techniques, according to an aspect of the invention, to central processing unit (CPU) utilization traces.
Figure 8:
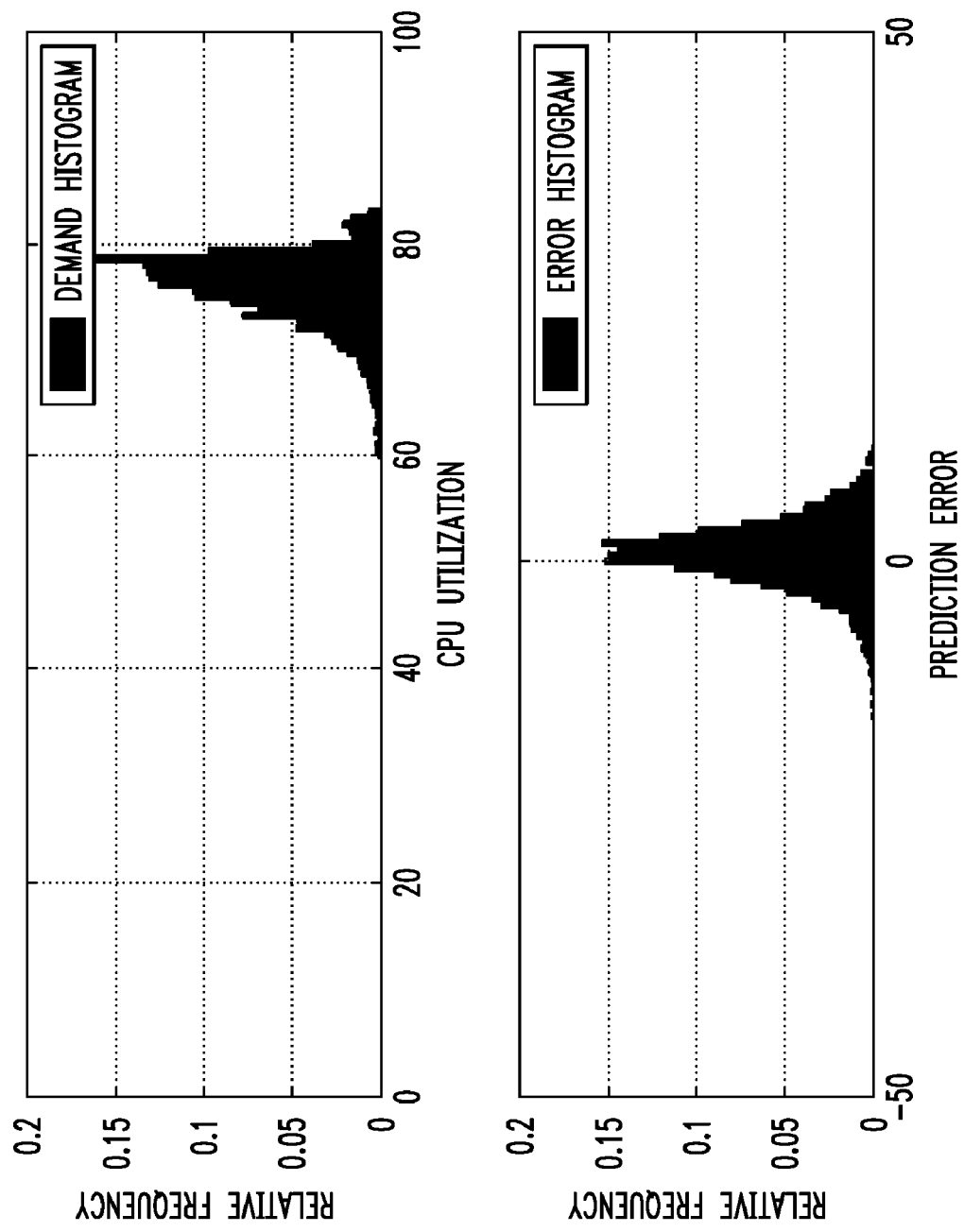
Figure 9:
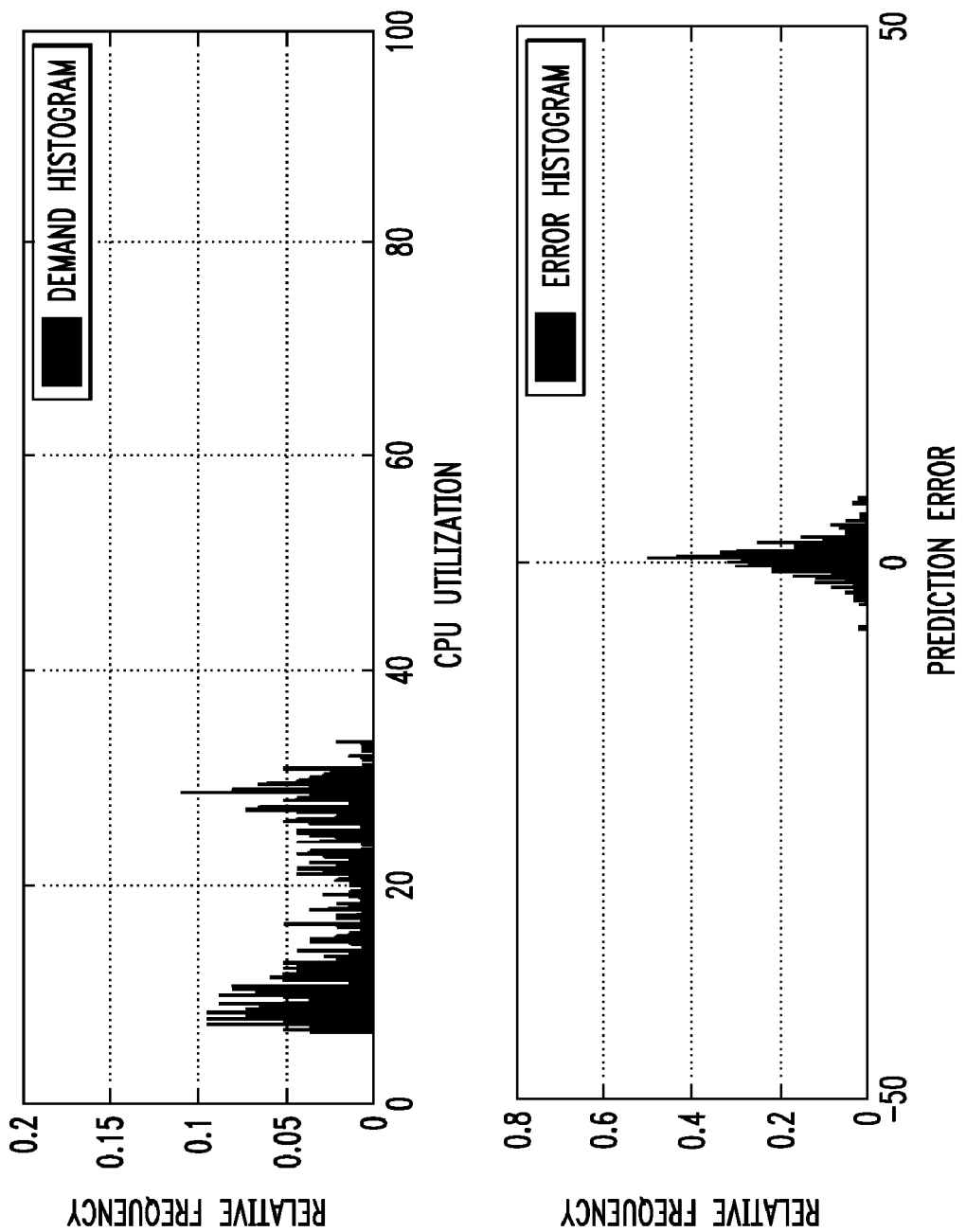

As a non-limiting example, FIGS. 7-9 show the results of applying the prediction techniques to the time series of FIGS. 4-6, respectively. Each figure shows the probability distribution of CPU demand (which is equivalent to CDFs shown in FIGS. 4-6) in the top plot, and the distribution of prediction error in the bottom plot. A significant factor in achieving a gain from dynamic management is the width of the predictor's error distribution being less than the width of the total demand distribution. See also the discussion of FIGS. 2 and 3 and Equation (4) and text proximate thereto. In discussing the data of FIG. 4 (corresponding to FIG. 7), it was noted that because of its strong variability and autocorrelation it would be a good candidate for dynamic migration. This is justified by the fact that the predictor's error distribution is much narrower than the demand distribution, as seen in FIG. 7. A similar observation applies to FIGS. 6 and 9, but not to FIGS. 5 and 8. It is now possible to apply the analytical gain formula discussed above. The table below compares the results of the analytical formula with the results of simulations.

| Configuration from | Value of Equation (4) | Simulation result | Relative error |
| --- | --- | --- | --- |
| FIG. 7 | 0.19 | 0.21 | 0.09 |
| FIG. 8 | −0.02 | −0.02 | 0.00 |
| FIG. 9 | 0.32 | 0.33 | 0.03 |

Management Techniques

A significant management objective is to minimize the time-averaged number of active physical servers hosting virtual machines, subject to the constraint that the rate of demand overloading the resource capacity is bounded by a specified threshold p (i.e., related to an SLA agreement). For example, an SLA may require that p=0.05, which means that the demand exceeds the capacity in no more than 5% of measurement intervals. This is achieved, in one or more embodiments, by the dynamic remapping of VMs to PMs at each update interval R. Machines that are not assigned VMs are put in an off- or low-power-state, depending on capability of the particular type of server (a non-limiting example of which is the so-called "blade server"). Servers are reactivated when required by the forecasting and placement techniques. The minimum data collection interval and forecast window used in this non-limiting example is 15 minutes. It is to be emphasized that different windows may be appropriate in other circumstances, depending on factors such as the granularity of measurement data, time and cost to migrate virtual machines, disruption to operation introduced by migration, policies, and the like.

In some instances, a simplifying assumption can be made that VM migration and PM activation occur at shorter timescales.

Figure 1:
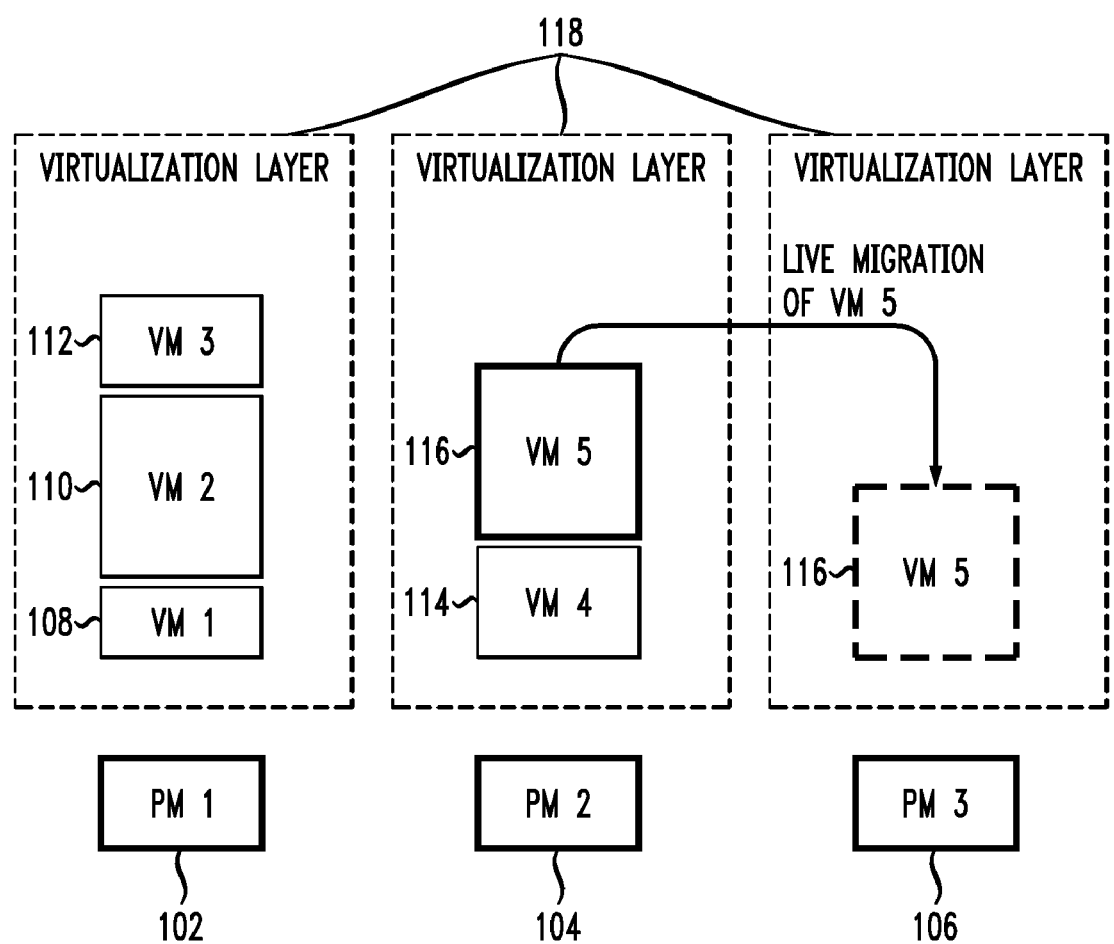
FIG. 1 depicts virtualization according to the prior art.

FIG. 10 shows an exemplary architecture of an apparatus 1000 that can be used to implement one or more inventive techniques, such as management techniques. A monitoring unit (e.g., measurement module 1002) collects resource demand data and saves it in a repository. A sliding window of this historic data is combined with the current metrics by the forecasting module 1004 to predict resource demand in the next interval. The predicted demand values are used by the optimization techniques implemented in the placement module 1006 to compute the mapping of VMs to PMs for the next interval. The placement module 1006 performs required migrations and the process iterates. The virtualized data center 1008 controlled by apparatus 1000 can be similar to that described above with regard to FIG. 1, and similar elements have received the same reference character and will not be described again.

Consider now the remapping techniques according to the constraints described above. The mapping problem is a version of a bin packing problem and is NP hard, thus an efficient heuristic is advantageously derived according to one or more aspects of the invention, based on a first-fit approximation. The skilled artisan is familiar with the term "NP hard," which means the exact solution cannot be computed in a time that is a polynomial function of the size of the problem (in this number of machines), i.e., it takes too long to compute the exact solution.

Consider a hosting environment of N VMs and M PMs, each PM having capacity $C^m$. The remapping interval (i.e., the time between two successive reallocation actions) is denoted by R and expressed in terms of discrete units of measurement intervals. The resource demand time series of the $n^{th}$ VM is $U_i^n$, with i being the time index. The distribution of demand corresponding to time series $U_i^n$ is $u^n(x)$, and $f_{i,k}^n$ is the forecast demand k units ahead of the current time i for VM n. As discussed above, the prediction error of each VM is approximated as a Gaussian distribution with mean $\mu_n$ and variance $\sigma_n^2$. Note that $\mu_n \approx 0$ because the predictor is unbiased. The capacity needed to guarantee an error rate less than p for this Gaussian is $c_p(\mu, \sigma^2)$. It is computed from the well known error function of a normal distribution, $\text{erf}(x)$. The notation is summarized in the table of FIG. 11.

FIG. 12 presents pseudo-code for the placement step of the MFR technique. First, the demand of each VM is forecast using the method discussed above. Based on the forecast, the VMs are sorted in descending order. Subsequent steps implement the first-fit bin packing heuristic, modified to enforce the constraints on the probability of exceeding the physical machine's capacity. In particular, each VM is taken off the ordered list and an attempt is made to place it on the PMs sequentially. For each target PM, the distribution of the sum of resource demands of all virtual machines allocated to this PM is computed. If the p-percentile of this distribution is no greater than the capacity of the PM, the VM is assigned to this PM. If the list of PMs is exhausted without satisfying this condition, the VM is assigned to the PM that has the smallest difference between allocated demands and its capacity. Note that while the first-fit heuristic used in this non-limiting example minimizes the active PMs, other packing heuristics can be applied for different objectives. For example, the worst fit heuristic which assigns each VM to the PM with greatest free capacity leads to a load-balanced allocation, providing the lowest rate of overloads.

Simulation Studies

Purely for purposes of illustration and not limitation, simulation studies are presented, based on simulations driven by traces gathered from hundreds of production servers running multiple operating systems (e.g., AIX® (registered mark of International Business Machines), Linux, Microsoft Windows® (registered mark of Microsoft Corporation)) and a broad variety of applications (e.g., databases, file servers, mail servers, application servers, web servers, and so on). The traces contain data for CPU, memory, storage, and network utilization with a 15-minute sampling frequency; however the non-limiting example herein focuses on CPU utilization. The absolute gain formula (derived above) is used to identify the traces that can benefit from dynamic management.

The simulation studies:
verify that the MFR meets SLA targets;
quantify the reduction in number of SLA violations and the number of PMs used to support a workload;
explore the relationship between the remapping interval and the gain from dynamic management; and
perform measurements on the VMWare ESX testbed (available from VMWare Inc. of PaloAlto, Calif., USA, http://www.vmware.com/ to determine properties of a practical virtualization infrastructure with respect to migration of VMs.

This experiment shows that the MFR algorithm meets the SLA objective for four values of overflow target (0.10, 0.07, 0.04 and 0.01). For a given p a set of 10 simulations is executed, each using a combination of 10 VM's selected at random from the set of production traces. The minimum, maximum, and average rate of overload violations are computed based on the 10 runs. The results are presented in the table below (a comparison of target overflow percentile (p) with the simulation results averaged over the test configurations). The results show that the technique meets or exceeds its targets.

| Target | Observed rate of overflows | | |
|---|---|---|---|
| p | Min | Average | Max |
| 0.10 | 0.02 | 0.03 | 0.04 |
| 0.07 | 0.02 | 0.03 | 0.03 |
| 0.04 | 0.01 | 0.02 | 0.03 |
| 0.01 | 0.00 | 0.01 | 0.01 |

Figure 13:
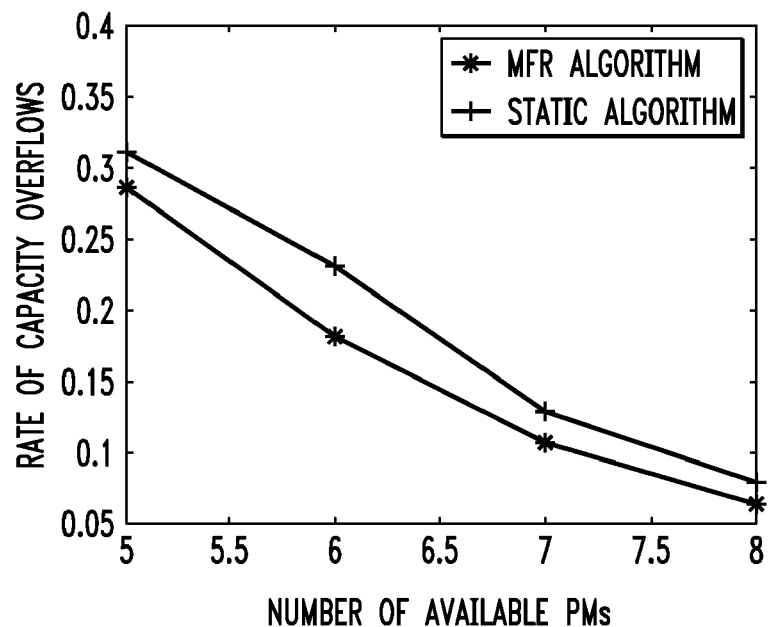
FIG. 13 shows an exemplary relationship between available capacity, in terms of the number of physical machines (PMs) and the overflow rate.

MFR generally outperforms static consolidation as measured by the rate of SLA violations at a fixed number of PMs. FIG. 13 shows a typical result obtained by applying MFR and static allocation to map a single set of 25 VMs onto a set of PMs. The number of available PMs is varied from 5 to 8, and the length of the forecast/migration interval is equal to that of the measurement interval (15 minutes). The rate of capacity overflows is reduced tip to 20% at 6 PMs. Note that the curves are expected to converge in the limiting cases of large and small numbers of PMs. At large numbers of PMs overcapacity drives the overload rate to zero, while at small numbers the MFR can no longer compensate for lack of capacity by dynamic moves.

Figure 14:
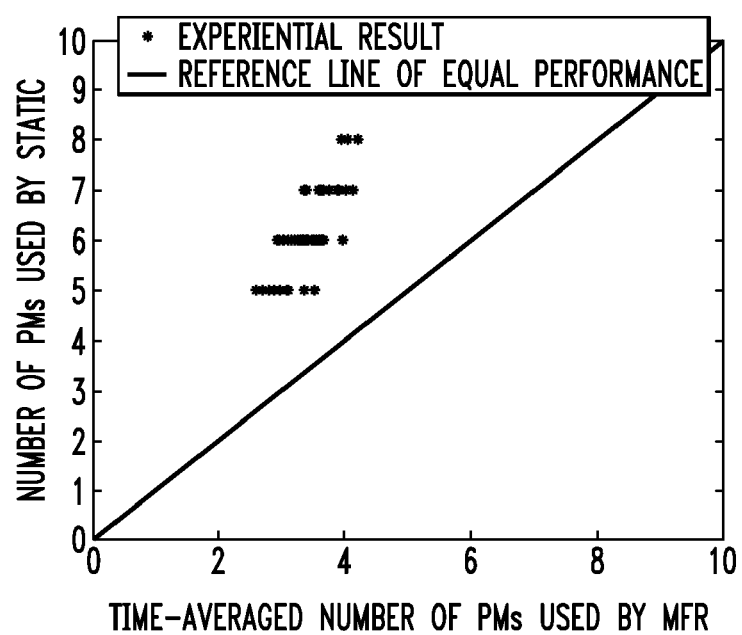
FIG. 14 shows a scatter plot of the number of PMs used by an exemplary inventive approach, as compared to a static approach.

FIG. 14 compares the time-averaged number of active PMs required by MFR (horizontal axis) and static allocation (vertical axis) at a specified rate of capacity violation. For each of 5, 6, 7, or 8 PMs a set of 10 simulations of MFR is executed using randomly selected subsets of production demand traces. The target rate of overload for MFR is equal to that achieved by static allocation for the given number of PMs. The forecast is made one interval ahead. Thus, each point on the scatter plot is the average number of active PMs used by MFR for the fixed number of PMs used in static allocation. For reference, the solid line in the figure is equal performance (the same number of PMs used by both algorithms). The dynamic approach uses significantly less resources; in particular, the average reduction in the time-averaged number of active PMs is 44% with minimum and maximum saving of 29% and 52%, respectively.

Figure 15:
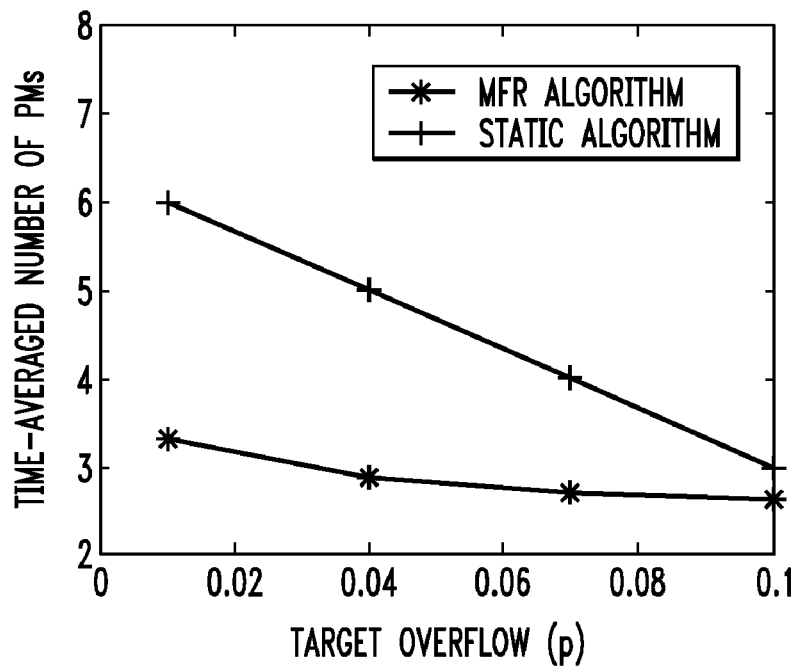
FIG. 15 shows a relationship between a target overflow percentile and time averaged number of servers, for one specific non-limiting application of an embodiment of the invention.

FIG. 15 shows the relationship between the specified SLA violation rate on the horizontal axis and the time-averaged number of PMs on the vertical axis for one of the test configurations. These values of p correspond to the first column of the table just above.

Figure 16:
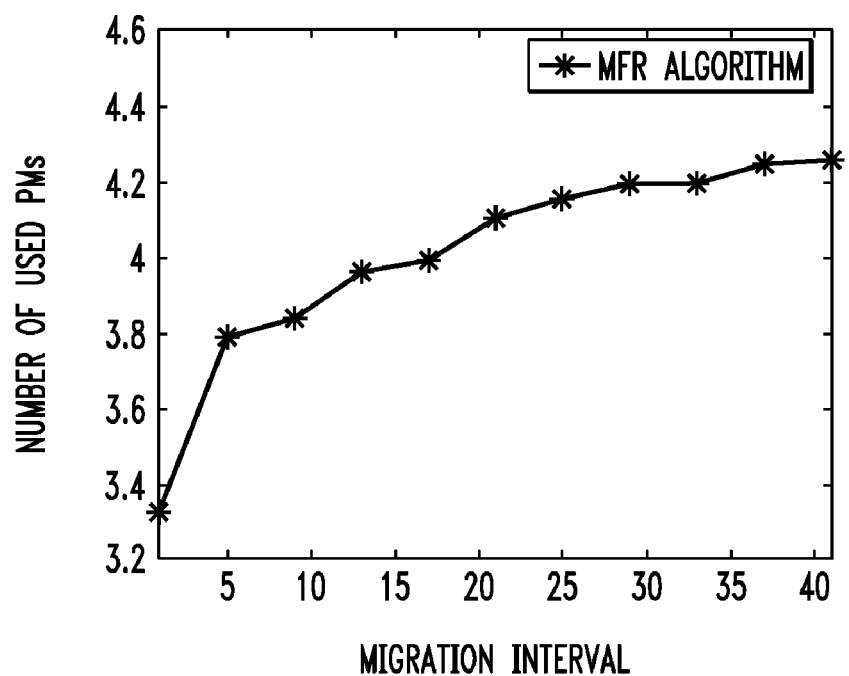
FIG. 16 shows an example relationship between the time-averaged number of PMs used and the migration interval.

The next set of experiments, presented for illustrative purposes, explore how MFR behaves for longer remapping intervals. FIG. 16 is a simulation study of the relationship between the lengths of the remapping interval ($\tau$) and the time-averaged number of used PMs. The horizontal axis represents a range of $\tau$ of 10 hours in 15-minutes measurement intervals. As the length of the remapping interval increases, the number of required PMs to support the workload with unchanged SLA guarantees increases. This is partially because the quality of the predictor decreases with the length of the prediction horizon, but also because the forecast is inherently conservative in that it sums the maximum of die forecast demand over R intervals for each VM independently. This exceeds the result if the forecasts were combined first prior to taking the maximum.

To quantify the time needed to migrate a VM, a series of experiments were performed. The testbed included three IBM Blade servers with VMWare ESX 2.5, available from VMware Inc. as discussed above. SDK, provided by VMWare, was used to programmatically execute the migrations. The VM's CPU utilization was varied while performing migrations. The migration time was found to be almost independent of the CPU utilization. The average VM migration time from source PM to target PM was 49.7 seconds. However, the machine remains active on the source PM until the final transfer of the state, which occurs within the last milliseconds of the migration.

Note that one of the mechanisms for resource allocation, useful in connection with one or more embodiments of the invention, is virtual machine migration, which allows for reallocation of an executing operating system between two physical machines without significant interruption (i.e., disruption of service on the order of milliseconds during the last phase of migration). An example of a technique that can be used to migrate VMs efficiently is described in C. Clark, K. Fraser, A. Hand, J. Hansen, E. Jul, C. Limpach, I. Pratt, and A. Warfield, Live Migration of Virtual Machines, in *Proceedings of the Symposium on Networked Systems Design and Implementation,* 2005.

By way of review, an exemplary management technique for dynamic allocation of virtual machines to physical servers is presented. The exemplary management technique pro-actively adapts to demand changes and migrates virtual machines between physical hosts, thus providing probabilistic SLA guarantees. Time series forecasting techniques and a bin packing heuristic are combined to minimize the number of physical machines required to support a workload. An exemplary method for characterizing the gain that a given virtual machine can achieve from dynamic migration is also presented. Experimental studies of the exemplary management technique and its applicability using traces from production data centers are shown. The exemplary management technique achieves significant reduction in resource consumption (up to 50% as compared to the static allocation) and also reduces the number of SLA violations. It is to be emphasized that the data presented herein is of an exemplary, non-limiting nature, and other instances of the invention may obtain different results.

Figure 17:
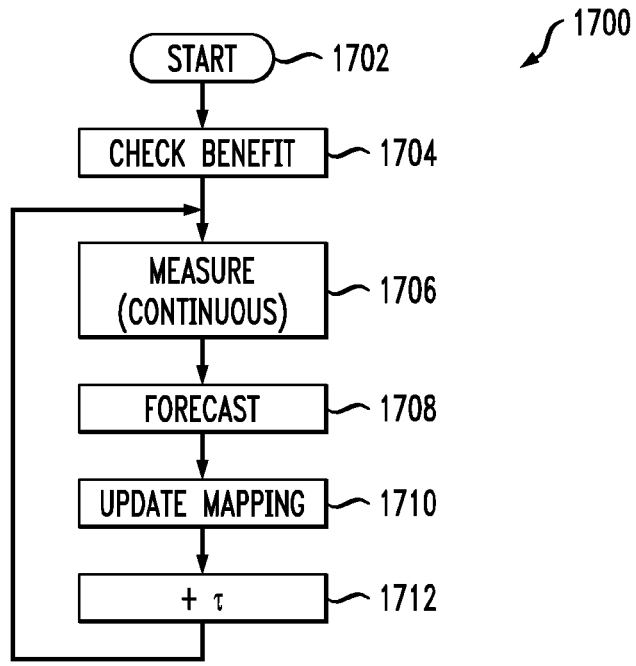
FIG. 17 is a flow chart of an exemplary method, according to another aspect of the invention.

In view of the above discussion, and with reference to the flow chart 1700 of FIG. 17, an exemplary method (which can be computer-implemented) is described for managing service capacity in a computer server system 1008 having a plurality of physical machines 102, 104, 106 and a plurality of virtual machines 108, 110, 112, 114, 116 mapped to the plurality of physical machines according to an initial mapping. After starting at block 1702, the method includes measuring historical data for the computer server system, at block 1706 (optional step 1704 is discussed below). Step 1708 includes forecasting future demand for service in the computer server system based on the historical data. Step 1710 includes updating the mapping of the virtual machines to the physical machines based on the forecasting of the future demand. An additional step 1712 can include iterating the measuring, forecasting, and updating steps at regular successive time intervals, $\tau$. Note that this terminology is also intended to encompass substantially continuous monitoring or measurement in block 1706.

In some instances, the demand is forecast in terms of a required number of the virtual machines, and the updating step 1710 includes determining a minimum number of the physical machines required to support the required number of virtual machines, subject to a constraint on a probability of overloading the physical machines during a given one of the successive time intervals, $\tau$.

As noted, an optional step 1704 may be included, wherein it is determined whether a given one of the virtual machines may benefit from dynamic management. This can be done, for example, by applying formula (4) above.

Figure 18:
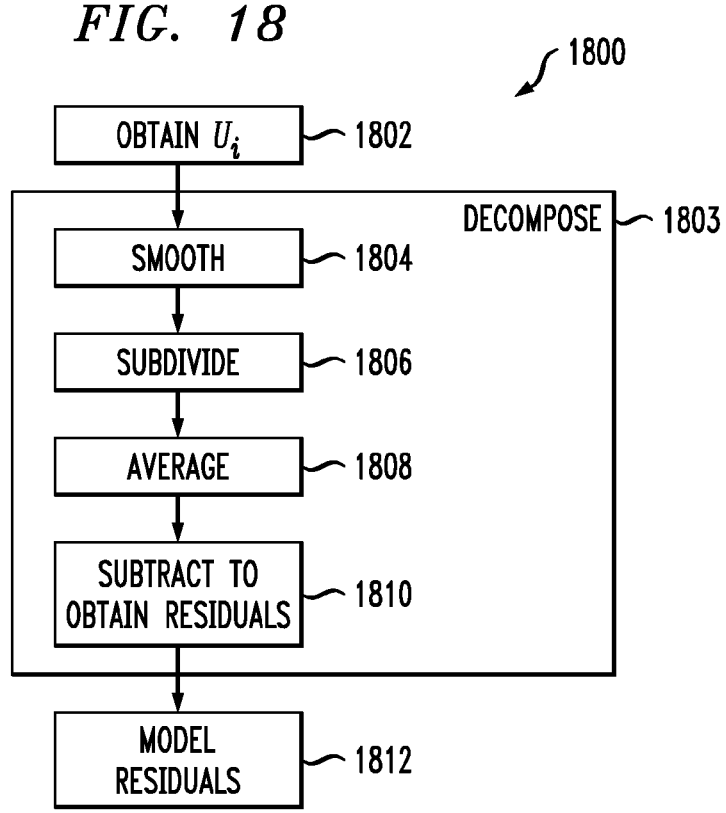

With reference to the flow chart 1800 of FIG. 18, in some instances, the demand forecasting step 1708 can include obtaining a demand time series $U_i$, as shown at block 1802. As at block 1803, the demand time series is decomposed into a sum of periodic components and residuals, while block 1812 includes modeling the residuals using an autoregressive process.

The residuals can be modeled as described above. The decomposing step 1803 can include smoothing the time series $U_i$ by low-pass filtering to obtain a smoothed time series, as at block 1804, as well as subdividing the smoothed time series into contiguous intervals over a learning history, as at block 1806. At block 1808, the intervals can be averaged to form average values, and at block 1810, the average values can be subtracted from corresponding values of the time series to obtain values of the residual terms $r_{i-1}$ and $r_{i-2}$.

Giving attention now to flow chart 1900 of FIG. 19, in some instances the updating step 1710 includes sorting the virtual machines in descending order to obtain an ordered list, as at block 1902. At block 1904, remove each given one of the virtual machines from the ordered list and attempt to place each given one of the virtual machines on the physical machines, treating each of the physical machines as a target physical machine, in a sequential fashion. At block 1906, for each of the target physical machines, compute a distribution of a sum of resource demands of all of the virtual machines allocated to the target physical machine. At decision block 1908, compare a p-percentile of the distribution of the sum to a capacity of the target physical machine. As per the "YES" branch, if the p-percentile is no greater than the capacity, assign the given one of the virtual machines to the target physical machine, at block 1910.

Conversely, if decision block 1908 yields a "NO," try any additional available physical machines, as at block 1912, where if there are more such machines available, steps 1904, 1906, and 1908 can be repeated. However, if no more machines are available, as per the "NO" branch of block 1912, then none of the target physical machines satisfy the condition that the p-percentile is no greater than the capacity. In such a case, as at block 1914, assign the given one of the virtual machines to one of the target physical machines having a smallest difference between the p-percentile of the distribution of the sum and the capacity of the one of the target physical machines.

By way of review, with regard to FIG. 10, an exemplary apparatus 1000 is provided for managing service capacity in a computer server system 1008 having a plurality of physical machines 102, 104, 106 and a plurality of virtual machines 108, 110, 112, 114, 116 mapped to the plurality of physical machines according to an initial mapping (for example, in the absence of initial load data, virtual machines could be equally apportioned across physical machines.). Apparatus 1000 includes measurement module 1002 configured to measure historical data for the computer server system 1008; forecasting module 1004 configured to forecast future demand for service in the computer server system 1008, based on the historical data; and placement module 1006 configured to update the mapping of the virtual machines to the physical machines based on the forecast of the future demand. The modules 1002, 1004, 1006 may be cooperatively configured to iterate the measurement, forecast, and update at regular successive time intervals, $\tau$, and to carry out one or more other method steps set forth herein.

Demand can be forecast in terms of a required number of the virtual machines 108, 110, 112, 114, 116 and placement module 1006 may be configured to update the mapping by determining a minimum number of the physical machines required to support the required number of virtual machines, subject to a constraint on a probability of overloading the physical machines during a given one of the successive time intervals, $\tau$. Placement module 1006 may also be configured to determine whether a given one of the virtual machines may benefit from dynamic management; for example, by applying equation (4).

Forecasting module 1004 can be configured to carry out any one or more steps shown in FIG. 18. Placement module 1006 can be configured to carry out any one or more steps shown in FIG. 19.

Aspects of the invention thus provide a method for characterizing the benefit from dynamic management of resources in a computer system based on parameters relating to performance and power management, as well as a method for characterizing the benefit from dynamic management of resources in a virtualized server environment based on time-series of resource utilization and/or properties of the virtualization infrastructure. Also provided is a method for characterizing the benefit from dynamic management of resources in a virtualized server environment with p-percentile tolerance for resource overflow based on the mean of resource demand, P-percentile of the resource demand, P-percentile of the demand prediction error, and/or time required to migrated virtual machines between physical hosts.

In other aspects, a method is provided for stochastic forecasting of power consumption in a computing system (e.g., virtualized server environment) for the purpose of power management, including one or more steps as shown in FIGS. 17-19. The resource allocation can be modified to enhance and even optimize power consumption and performance. Prediction may involve, for example, computing and subtracting the seasonal components, and predicting the residual process using an Autoregressive Moving Average process.

In a still further aspect, a method is provided for determining the benefit of modifying the virtualization infrastructure to decrease power consumption, accounting for statistical properties of resource demand, migration time required to move virtual machine from one physical host to another, variability of resource demand and quality of state-of-the art predictor for the demand, and/or migration time required to move virtual machine from one physical host to another.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps. The aforementioned modules 1002, 1004, and 1006 can be implemented, for example, in hardware, software, a combination thereof, as one or more processors running software in one or more memories, and so on.

One or more embodiments can make use of software running on a general purpose computer or workstation. With reference to FIG. 20, such an implementation might employ, for example, a processor 2002, a memory 2004, and an input/output interface formed, for example, by a display 2006 and a keyboard 2008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2002, memory 2004, and input/output interface such as display 2006 and keyboard 2008 can be interconnected, for example, via bus 2010 as part of a data processing unit 2012. Suitable interconnections, for example via bus 2010, can also be provided to a network interface 2014, such as a network card, which can be provided to interface with a computer network, and to a media interface 2016, such as a diskette or CD-ROM drive, which can be provided to interface with media 2018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 2018) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 2004), magnetic tape, a removable computer diskette (for example media 2018), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 2002 coupled directly or indirectly to memory elements 2004 through a system bus 2010. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 2008, displays 2006, pointing devices, and the like) can be coupled to the system either directly (such as via bus 2010) or through intervening I/O controllers (omitted for clarity).

Network adapters such as network interface 2014 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for managing service capacity in a computer server system having a plurality of physical machines and a plurality of virtual machines mapped to said plurality of physical machines according to an initial mapping, said method comprising the steps of:
   measuring historical data for said computer server system;
   forecasting future demand for service in said computer server system based on said historical data, wherein said future demand is forecast in terms of a required number of said virtual machines;
   updating said mapping of said virtual machines to said physical machines based on said forecasting of said future demand, wherein said updating step comprises determining a minimum number of said physical machines required to support said required number of virtual machines, subject to a constraint on a probability of overloading said physical machines during a given one of regular successive time intervals, $\tau$; and
   iterating said measuring, forecasting, and updating steps at said regular successive time intervals, $\tau$.

2. The method of claim 1, further comprising the additional step of determining whether a given one of said virtual machines may benefit from dynamic management.

3. The method of claim 2, wherein said determining comprises applying the approximation formula:

$$G(\tau) \approx 1 - (E[U] + E_p(\tau))/L_p, \text{ where:}$$

$G(\tau)$ is an expected gain from said dynamic management;
$L_p$ is p-percentile distribution of demand probability density;
$E_p(\tau)$ is p-percentile distribution of predictor error; and
$E[U]$ is a mean of said predictor error.

4. The method of claim 1, wherein said demand forecasting step comprises:
   obtaining a demand time series $U_i$;
   decomposing said demand time series into a sum of periodic components and residuals; and
   modeling said residuals using an autoregressive process.

5. The method of claim 4, wherein said residuals are modeled by:

$$r_i = \alpha_1 r_{i-1} + \alpha_2 r_{i-2} + \epsilon_i, \text{ for } i=0, 1, \ldots, \text{ and where:}$$

$\epsilon_i$ are error terms; and
$\alpha_i$ and $\alpha_2$ are estimated from data.

6. The method of claim 5, wherein said decomposing step comprises:
   smoothing said time series $U_i$ by low-pass filtering to obtain a smoothed time series;
   subdividing said smoothed time series into contiguous intervals over a learning history;
   averaging said intervals to form average values; and
   subtracting said average values from corresponding values of said time series to obtain values of said residual terms $r_{i-1}$ and $r_{i-2}$.

7. The method of claim 1, wherein said updating step comprises:
   sorting said virtual machines in descending order to obtain an ordered list;
   removing each given one of said virtual machines from said ordered list and attempting to place each given one of said virtual machines on said physical machines, treating each of said physical machines as a target physical machine, in a sequential fashion;

for each of said target physical machines, computing a distribution of a sum of resource demands of all of said virtual machines allocated to said target physical machine;

comparing a p-percentile of said distribution of said sum to a capacity of said target physical machine; and if said p-percentile is no greater than said capacity, assigning said given one of said virtual machines to said target physical machine.

8. The method of claim 1, wherein said updating step comprises:

sorting said virtual machines in descending order to obtain an ordered list;

removing each given one of said virtual machines from said ordered list and attempting to place each given one of said virtual machines on said physical machines, treating each of said physical machines as a target physical machine, in a sequential fashion;

for each of said target physical machines, computing a distribution of a sum of resource demands of all of said virtual machines allocated to said target physical machine;

comparing a p-percentile of said distribution of said sum to a capacity of said target physical machine; and if none of said target physical machines satisfy a condition that said p-percentile is no greater than said capacity, assigning said given one of said virtual machines to one of said target physical machines having a smallest difference between said p-percentile of said distribution of said sum and said capacity of said one of said target physical machines.

9. An apparatus for managing service capacity in a tangible computer server system having a plurality of physical machines and a plurality of virtual machines mapped to the plurality of physical machines according to an initial mapping, said apparatus comprising:

a measurement module configured to measure historical data for the computer server system;

a forecasting module configured to forecast future demand for service in the computer server system based on said historical data, wherein said future demand is forecast in terms of a required number of said virtual machines;

a placement module configured to update said mapping of said virtual machines to the physical machines based on said forecast of said future demand by determining a minimum number of said physical machines required to support said required number of virtual machines, subject to a constraint on a probability of overloading said physical machines during a given one of regular successive time intervals, $\tau$, wherein said modules are cooperatively configured to iterate said measurement, forecast and update at said regular successive time intervals, $\tau$.

10. The apparatus of claim 9, wherein said placement module is configured to determine whether a given one of said virtual machines may benefit from dynamic management.

11. The apparatus of claim 10, wherein said placement module is configured to make said determination by applying the approximation formula:

$$G(\tau) \approx 1 - (E[U] + E_p(\tau))/L_p, \text{ where:}$$

$G(\tau)$ is an expected gain from said dynamic management;
$L_p$ is p-percentile distribution of demand probability density;
$E_p(\tau)$ is p-percentile distribution of predictor error; and
$E[U]$ is a mean of said predictor error.

12. The apparatus of claim 9, wherein said forecasting module is configured to:

obtain a demand time series $U_i$;

decompose said demand time series into a sum of periodic components and residuals; and model said residuals using an autoregressive process.

13. The apparatus of claim 12, wherein said residuals are modeled by:

$$r_i = \alpha_1 r_{i-1} + \alpha_2 r_{i-2} + \epsilon_i, \text{ for } i=0, 1, \ldots, \text{ and where:}$$

$\epsilon_i$ are error terms; and
$\alpha_1$ and $\alpha_2$ are estimated from data.

14. The apparatus of claim 13, wherein said forecasting module is configured to decompose said demand time series by:

smoothing said time series $U_i$ by low-pass filtering to obtain a smoothed time series;

subdividing said smoothed time series into contiguous intervals over a learning history;

averaging said intervals to form average values; and subtracting said average values from corresponding values of said time series to obtain values of said residual terms $r_{i-1}$ and $r_{i-2}$.

15. The apparatus of claim 9, wherein said placement module is configured to update said mapping by:

sorting said virtual machines in descending order to obtain an ordered list;

removing each given one of the virtual machines from said ordered list and attempting to place each given one of the virtual machines on the physical machines, treating each of the physical machines as a target physical machine, in a sequential fashion;

for each of the target physical machines, computing a distribution of a sum of resource demands of all of the virtual machines allocated to the target physical machine;

comparing a p-percentile of said distribution of said sum to a capacity of the target physical machine; and if said p-percentile is no greater than said capacity, assigning the given one of the virtual machines to the target physical machine.

16. The apparatus of claim 9, wherein said placement module is configured to update said mapping by:

sorting the virtual machines in descending order to obtain an ordered list;

removing each given one of the virtual machines from said ordered list and attempting to place each given one of the virtual machines on the physical machines, treating each of the physical machines as a target physical machine, in a sequential fashion;

for each of the target physical machines, computing a distribution of a sum of resource demands of all of the virtual machines allocated to the target physical machine;

comparing a p-percentile of said distribution of said sum to a capacity of the target physical machine; and if none of the target physical machines satisfy a condition that said p-percentile is no greater than said capacity, assigning the given one of the virtual machines to one of the target physical machines having a smallest difference between said p-percentile of said distribution of said sum and said capacity of the one of the target physical machines.

17. An apparatus for managing service capacity in a tangible computer server system having a plurality of physical machines and a plurality of virtual machines mapped to the plurality of physical machines according to an initial mapping, said apparatus comprising:
- means for measuring historical data for the computer server system;
- means for forecasting future demand for service in the computer server system based on said historical data, wherein said future demand is forecast in terms of a required number of said virtual machines;
- means for updating said mapping of the virtual machines to the physical machines based on said forecast of said future demand by determining a minimum number of said physical machines required to support said required number of virtual machines, subject to a constraint on a probability of overloading said physical machines during a given one of regular successive time intervals, $\tau$, wherein said means are cooperatively configured to iterate said measurement, forecast and update at said regular successive time intervals, $\tau$.

18. A computer program product comprising a non-transitory computer usable readable recordable medium tangibly storing computer usable program code for managing service capacity in a computer server system having a plurality of physical machines and a plurality of virtual machines mapped to the plurality of physical machines according to an initial mapping, said computer program product including:
- computer usable program code for measuring historical data for said computer server system;
- computer usable program code for forecasting future demand for service in said computer server system based on said historical data, wherein said future demand is forecast in terms of a required number of said virtual machines;
- computer usable program code for updating said mapping of said virtual machines to said physical machines based on said forecasting of said future demand by determining a minimum number of said physical machines required to support said required number of virtual machines, subject to a constraint on a probability of overloading said physical machines during a given one of regular successive time intervals, $\tau$; and
- computer usable program code for iterating said measuring, forecasting, and updating steps at said regular successive time intervals, $\tau$.

* * * * *